United States Patent [19]

Charboneau

[11] 3,781,632
[45] Dec. 25, 1973

[54] SERIES TYPE SOLID STATE VOLTAGE REGULATOR WHICH PROVIDES CONSTANT VOLTAGE TO A STORAGE DEVICE

[75] Inventor: Ben J. Charboneau, West Branch, Mich.

[73] Assignee: Sno-Start, Inc., West Branch, Mich.

[22] Filed: Feb. 23, 1973

[21] Appl. No.: 335,164

Related U.S. Application Data

[63] Continuation of Ser. No. 201,637, Nov. 24, 1971, abandoned.

[52] U.S. Cl.............. 320/39, 307/252 J, 320/51, 320/DIG. 2, 323/22 SC, 323/39, 322/28, 322/32
[51] Int. Cl.............................................. H02j 7/10
[58] Field of Search ................. 320/9, 27, 39, 51, 320/53, 40, DIG. 2; 321/11; 317/50; 307/252 J; 323/22 SC, 36, 39; 322/32, 89, 94, 24, 28

[56] References Cited
UNITED STATES PATENTS

| | | | |
|---|---|---|---|
| 3,114,095 | 12/1963 | Palmer | 320/DIG. 2 |
| 3,267,288 | 8/1966 | Maiden et al. | 320/DIG. 2 |
| 3,733,535 | 5/1973 | Ballman | 320/40 |

FOREIGN PATENTS OR APPLICATIONS

| | | | |
|---|---|---|---|
| 1,051,470 | 12/1966 | Great Britain | 320/DIG. 2 |

Primary Examiner—Gerald Goldberg
Attorney—Arthur Raisch et al.

[57] ABSTRACT

A solid state voltage regulator electrically connected between a current source and a battery having a series SCR through which charging current is conducted whenever the battery voltage drops to a certain level. The current source supplies an unregulated pulsating DC output as an input to the regulator. The anode terminal of the SCR is connected to the positive terminal of the current source, the gate terminal of the SCR to a zener diode and the cathode terminal of the SCR to the positive battery terminal. The parallel combination of a resistor and a capacitor is connected from the positive terminal of the current source to the cathode terminal of the zener diode to provide a delay in the voltage rise at the cathode of the zener diode. When the battery voltage is sufficiently low to develop the necessary gate-cathode voltage for firing the SCR, gate current is drawn through the resistor and capacitor in sufficient amount to guarantee firing of the SCR. A diode is also connected between the gate terminal of the SCR and the cathode terminal of the zener diode to prevent reverse current flow from the battery through the cathode-gate circuit of the SCR to the zener diode. A capacitor may also be electrically connected across the regulator output to provide regulated DC power without a battery.

5 Claims, 1 Drawing Figure

PATENTED DEC 25 1973
3,781,632
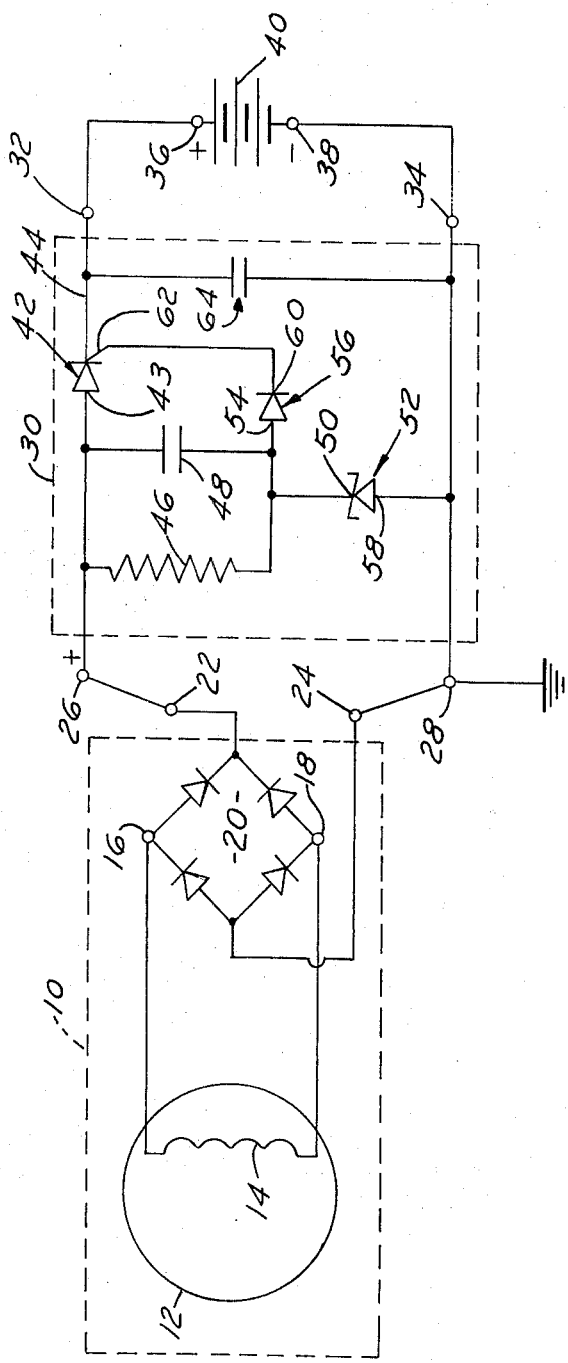
INVENTOR.
BEN J. CHARBONEAU
BY
Barnes, Kisselle, Raisch & Choate
ATTORNEYS

SERIES TYPE SOLID STATE VOLTAGE REGULATOR WHICH PROVIDES CONSTANT VOLTAGE TO A STORAGE DEVICE

This is a continuation of application Ser. No. 201,637, filed Nov. 24, 1971 now abandoned.

This invention relates to voltage regulators and more specifically to a solid state voltage regulator of the series type which maintains a reasonably constant DC voltage across an energy storage device such as a capacitor or a battery.

In regulators of the above type, as stored energy is consumed by the load connected to the energy storage device, the voltage across the device drops. When the voltage drops below a certain level, the regulator closes a solid state switch connected in series between a DC current source and the energy storage device to conduct charging current from the source to the storage device and replenish the stored energy. As the amount of stored energy increases, the voltage across the device rises. Upon the voltage attaining a certain level, the regulator opens the solid state switch to interrupt the flow of charging current and prevent the voltage across the device from reaching too high a value. Thus, the regulator maintains a reasonably constant DC voltage across the energy storage device.

Such solid state voltage regulators may be advantageously employed on a powered mobile vehicle in conjunction with an engine-driven alternator or magneto-generator to maintain the vehicle battery in a charged condition. The AC output of the magneto-generator is rectified preferably by a rectifier bridge to provide an unregulated pulsating DC input to the voltage regulator. One known embodiment of this type of solid state voltage regulator has an SCR operating as the series switch through which charging current is conducted. The SCR anode terminal is electrically connected to the unregulated pulsating DC output of the rectifier bridge, and the SCR cathode terminal is electrically connected to the positive battery terminal. A zener diode is electrically connected to the SCR gate terminal and an electric circuit is connected between the zener diode and the output of the rectifier bridge to supply zener current for the zener diode. When the zener diode operates in its zener region, it supplies a relatively constant reference voltage to the SCR gate. Therefore, as the battery voltage drops, an increasing voltage is developed across the gate-cathode circuit of the SCR; and when this gate-cathode voltage reaches a certain minimum magnitude, the SCR can turn on to conduct charging current to the battery. An inherent characteristic of an SCR is that in addition to the above minimum gate-cathode voltage, a certain minimum amount of gate current must be available if the SCR is to turn on. Therefore, if the regulator is to operate properly, a source of sufficient gate current must be supplied to the SCR.

One of the problems associated with construction of this type of voltage regulator on a high-volume production basis is that it is virtually impossible to achieve consistent reliability in all manufactured units without greatly increasing the cost of the regulator. The reason for this is that the relatively low-cost solid state components have rather large tolerances. Therefore, when regulator units are constructed from randomly selected components, a number of units may not perform according to spec when installed in a vehicle. A significant problem is that there may be insufficient gate current for the SCR at low generator speeds. Thus, where the assembled regulator unit has been encapsulated during the assembly process, the entire unit must be scrapped.

Various solutions are possible for this problem, but for various reasons are less practical than the solution provided by the voltage regulator of the present invention hereinafter described. Such solutions entail either more complex circuit structures to compensate for component tolerance variations or increased precision in the component tolerances. The problem, of course, with either of these solutions is that the cost of the regulator is substantially increased.

The regulator of the present invention solves two specific problems (more fully described hereinafter) which result from the substantial variation in the gate-cathode resistance characteristic of relatively low-cost SCR's. In SCR's of this type, the gate-cathode resistance may vary from a minimum value up to more than several times that value. For example, in one particular model of SCR, the gate-cathode resistance has been observed to vary from 70 ohms to 500 ohms. The voltage regulator of the present invention permits such low-cost SCR's to be utilized in a highly reliable regulator in spite of their inherently high-variable gate-cathode resistance.

Therefore, a principal object of the invention is to provide a voltage regulator suitable for high production assembly without need to individually match circuit components.

Another important object is to provide a voltage regulator in accordance with the preceding object which utilizes relatively low-cost circuit components.

A further object is to provide a low-cost voltage regulator which is of high reliability and relatively simple construction.

Other objects and advantages of the invention will be seen in the accompanying drawing and description wherein a preferred embodiment of the invention is set forth.

The drawing illustrates the schematic diagram of the voltage regulator of the invention connected between a current source and a DC battery.

A DC current source 10 shown in the drawing comprises a magneto-generator 12 having an output winding 14 which is connected across the input terminals 16 and 18 of a full wave rectifier bridge 20. Bridge 20 rectifies the AC output generated in winding 14 into a pulsating DC output across output terminals 22 and 24 of bridge 20. The output voltage - current characteristic of current source 10 is a function of (1) the load on current source 10 and (2) the speed at which magneto-generator 12 is driven. The voltage regulator of the invention operates in either (1) a charging mode to supply current from source 10 to a battery to be charged or (2) a noncharging mode. Correspondingly, the operation of current source 10 is bimodal. When operating in the latter noncharging mode, current source 10 develops the pulsating DC voltage across terminals 22 and 24 such that its amplitude and frequency increase with increasing speed of magneto-generator 12. More specifically, in this condition current source 10 is essentially unloaded, and when magneto-generator 12 operates above a certain minimum speed, produces DC voltage pulses across terminals 22 and 24 whose peak amplitude is noticeably larger than the voltage of the battery to be charged and increases in accordance with magneto-generator speed to a value which is typically many times larger than that of the battery voltage. On the other hand, when current source 10 operates in the former mode (i.e., charging condition), the peak amplitude of the DC voltage pulses is limited by the battery voltage, and although the pulses have a frequency which is proportional to the speed of magneto-generator 12, the pulses have essentially flat peaks whose amplitude is established in accordance with the battery voltage.

The output terminals 22 and 24 of bridge 20 are connected to the input terminals 26 and 28 respectively of the voltage regulator 30 of the invention. The output terminals 32 and 34 of regulator 30 are connected respectively to the positive terminal 36 and the negative terminal 38 of a DC battery 40.

Regulator 30 comprises an SCR 42 whose anode terminal 43 is connected to terminal 26 and whose cathode terminal 44 is connected to terminal 32. Thus, SCR 42 is connected in series between current source 10 and battery 40 to conduct charging current from source 10 to battery 40 whenever SCR 42 is turned on by the firing circuit of regulator 30.

The firing circuit for SCR 42 comprises the parallel combination of a resistor 46 and a capacitor 48. One side of this parallel combination is connected in common with terminals 26 and 43 and the other side is connected in common with the cathode terminal 50 of a zener diode 52 and the anode terminal 54 of a diode 56. The anode terminal 58 of zener diode 52 is connected to terminal 28, while the cathode terminal 60 of diode 56 is connected to the gate terminal 62 of SCR 42. The electrically common terminals 24, 28, 34, 38 and 58 are all grounded. A capacitor 64, which permits the regulator to operate without battery 40, is connected across the output terminals 32 and 34.

When battery 40 is fully charged, the regulator operates in the noncharging mode with SCR 42 nonconducting. Thus, the only load on current source 10 is that of resistor 46, capacitor 48 and zener diode 52. The DC pulses input to regulator 30 across terminals 26 and 28 causes zener diode 52 to operate in its zener region during a certain fraction of each pulse. At the beginning of each input pulse, zener diode 52 is electrically equivalent to a relatively large resistance. Thus, during an initial fraction of each input pulse, the load on current source 10 is that of the parallel combination of resistor 46 and capacitor 48 in series with the equivalent resistance of zener diode 52. Capacitor 48 delays the voltage rise at cathode 50 of zener diode 52, and this delay is essentially a function of the RC time constant of resistor 46 and capacitor 48 because the equivalent zener resistance is large relative to resistor 46. When the voltage across zener diode 52 reaches the necessary "firing" voltage, zener diode 52 avalanches to become electrically equivalent to a low impedance voltage source. Thereafter, resistor 46 and capacitor 48 are effectively connected across the output terminals 22 and 24 of current source 10 and see the full magnitude of the voltage pulse less the constant voltage drop across zener diode 52. Current flow through the parallel combination of resistor 46 and capacitor 48, and hence through zener diode 52, is at this time dependent upon the values of resistor 46 and capacitor 48 and the output impedance characteristics of current source 10. Zener diode 52 is rated to carry the maximum current flow through resistor 46 and capacitor 48 which occurs at the highest driven speed of magneto-generator 12. The RC time constant of resistor 46 and capacitor 48 is selected relative to the highest frequency of the DC input pulses to the regulator so that when the magnitude of the input pulse voltage begins to decrease, the flow of current through zener diode 52 is maintained to continue operation thereof in the zener region. Thus, zener diode 52 operates in the zener region during the latter portion of each DC input pulse to supply its zener reference voltage to gate terminal 62 of SCR 42 via diode 56. So long as battery 40 is in a charged condition wherein its voltage is sufficiently high to prevent the occurrence of the necessary voltage differential across gate 62 and cathode 44 of SCR 42 from turning on the SCR, the noncharging condition is maintained.

Because the turn-on characteristic of SCR 42 is a function of both the gate-cathode voltage and the gate-cathode current, a sufficient amount of current must be available at gate 62 in order to fire SCR 42 when the necessary gate-cathode firing voltage is developed. Because of the wide tolerance range in the gate-cathode resistance of the same model of SCR, the circuit connected to the gate must provide sufficient current to guarantee firing of the SCR irrespective of the gate-cathode resistance variations. The parallel combination of resistor 46 and capacitor 48 provides a well-suited circuit for guaranteeing sufficient gate circuit. Thus, when the voltage of battery 40 drops to a sufficient level to develop the requisite gate-cathode firing voltage for SCR 42, gate current is drawn from source 10 through the parallel combination of capacitor 48 and resistor 46. It has been observed that capacitor 48 improves the operation of regulator 30 at low generator speeds and therefore the values of capacitor 48 and resistor 46 are selected in light of the lowest contemplated operating speed of magneto-generator 12 and the gate-cathode resistance tolerance of SCR 42. This arrangement guarantees that when the requisite gate-cathode voltage is developed across SCR 42, the SCR will always turn on to conduct charging current from current source 10 to battery 40 independent of variations in the gate-cathode resistance of SCR 42 over the allowable tolerance range of that resistance characteristic. A further advantage of the parallel combination of resistor 46 and capacitor 48 resides in the inherent delay in the firing of zener diode 52 relative to the unregulated DC pulse input to the regulator. Because of this delay, the voltage at anode 43 of SCR 42 is considerably higher than the battery voltage when zener diode 52 fires. Consequently, should the battery voltage be low enough to command recharging, large larger surge of current is conducted through SCR 42 from current source 10 to the battery thereby improving battery charging. In prior types of voltage regulators where only a resistor is provided in place of the parallel resistor-capacitor combination, such advantages are not achieved.

Another problem which has been observed to occur because of variations in gate-cathode resistance of the series SCR is overloading of the zener diode 52 during the latter portion of the charging mode. As the battery voltage increases toward its fully charged level during the latter portion of the charging mode, the nature of the charging current changes from a heavy charging condition to what may be termed a trickling condition. During this latter condition, it is possible for the battery voltage to exceed its fully charged level momentarily whenever SCR 42 conducts current from current source 10. Absent diode 56, this increased voltage, when delivered through a low-resistance gate-cathode of SCR 42, would create excessive current flow through zener diode 52. Such current delivered through the zener diode voltage would generate power greater than the power rating of the zener diode and consequently, the zener diode would be likely to burn up. By inserting diode 56 between gate terminal 62 of SCR 42 and cathode 50 of zener diode 52, such reverse current flow from the battery through the cathode-gate circuit of the SCR to the zener diode is prevented. Thus, the zener diode is protected from this potentially destructive condition which arises from relatively low-resistance gate-cathode circuits of the SCR.

Capacitor 64 allows regulator 30 to supply regulated DC voltage for a DC electrical system even when battery 40 is not used. Capacitor 64 is of relatively large capacity and regulator 30 operates in substantially the same fashion as described above in connection with battery 40 to maintain capacitor 64 in a charged condition wherein the capacitor voltage is regulated closely over substantially the same voltage range as the voltage of battery 40. That is, with the capacitor fully charged, its voltage is slightly less than the zener reference voltage. When capacitor 64 supplies current, such as to the electrical system of the vehicle, the cathode voltage of SCR 42 gradually decreases until the necessary gate-cathode voltage is again developed to turn on SCR 42 which then conducts current from source 10 to replenish the charge of capacitor 64.

By way of example, the following circuit components have been successfully utilized in a 120 watt voltage regulator of the invention to provide regulated 12-volt DC electrical power:

| | |
|---|---|
| SCR 42 | 10 amps. avg. |
| Resistor 46 | 5 K |
| Capacitor 48 | 0.1 microfarads |
| Zener Diode 52 | 15v. ±5%, 1 watt |
| Diode 56 | 15 ma. approx. |
| Capacitor 64 | 500 microfarads |

I claim:

1. In combination a source of unregulated, pulsating electrical energy including generator means of the type adapted to be driven by an engine or the like so that said source provides an electrical output signal whose frequency and amplitude are a function of the speed of said generator means, energy storage means having a voltage characteristic which varies as a function of the energy stored therein, and voltage regulator means electrically connected between said source and said storage means for maintaining the voltage of said storage means within controlled limits, said voltage regulator means comprising controlled rectifier means having first and second main electrodes and a control electrode for controlling conduction through said main electrodes in response to a control signal, said first main electrode being electrically connected to a first output terminal of said source and said second main electrode being electrically connected to a first input terminal of said storage means, a second input terminal of said storage means being electrically connected to a second output terminal of said source so that said controlled rectifier means is electrically connected in series with said storage means across said output terminals to control the flow of electrical energy from said source to said storage means, and control signal circuit means for providing said control signal to said control electrode in accordance with the voltage level of said energy storage means comprising electrical breakdown means of the Zener diode type for supplying a predetermined reference voltage, one terminal of said breakdown means being electrically connected to said control electrode and the other terminal of said breakdown means being electrically connected to said second input terminal of said storage means such that said reference voltage can be compared against said voltage of said energy storage means through said control electrode and the other of said main electrodes, said control signal circuit means further comprising capacitance means operative at low generator speeds to delay voltage at said breakdown means and thereby insure that said reference voltage is present at said control electrode when the voltage at said source exceeds said storage means voltage near the beginning of each input pulsation, said capacitance means being electrically connected between said one terminal of said breakdown means and one of said main electrodes, and resistance means connected in parallel with said capacitance means to limit current through said breakdown means at high generator speeds when said controlled rectifier means is not conducting.

2. The combination set forth in claim 1 wherein said controlled rectifier is a silicon controlled rectifier having an anode electrode connected to a positive output terminal of said source and a cathode electrode connected to a positive terminal of said energy storage means, said control electrode being a gate electrode, said breakdown means comprises a Zener diode having its anode connected to negative terminals of said energy storage means and said source and its cathode electrically connected to said gate electrode, said paralleled resistance means and capacitance means is connected between said anode of said controlled rectifier and said cathode of said Zener diode.

3. The combination set forth in claim 2 wherein said cathode of said Zener diode is connected to said gate electrode of said controlled rectifier means through a two-terminal rectifier poled in a direction to prevent reverse current flow through said gate and cathode of said controlled rectifier to said Zener diode.

4. The combination set forth in claim 3 wherein said energy storage means is a capacitor.

5. The combination set forth in claim 3 wherein said energy storage means is a battery.

* * * * *

UNITED STATES PATENT OFFICE
CERTIFICATE OF CORRECTION

Patent No. 3,781,632　　　　　　　　　Dated December 25, 1973

Inventor(s) Ben J. Charboneau

It is certified that error appears in the above-identified patent and that said Letters Patent are hereby corrected as shown below:

Column 1, line 61, "relability" should be --reliability--.

Column 4, line 52, delete "large larger" and insert --a large--.

Column 6, line 54 (claim 4), "3" should be --1--.

Column 6, line 56 (claim 5), "3" should be --1--.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents